May 4, 1937.  C. E. GARDNER  2,079,116
SEMIPOTTED PLANT PACKAGE
Filed March 4, 1936   2 Sheets-Sheet 1
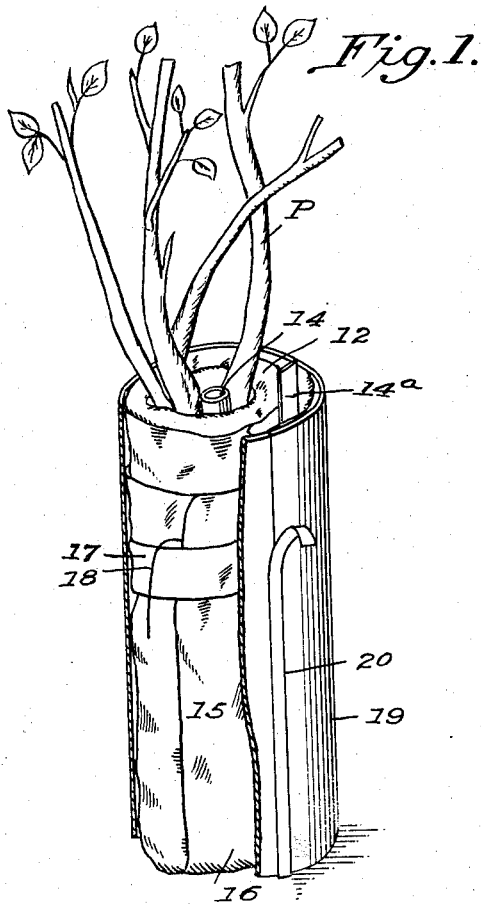
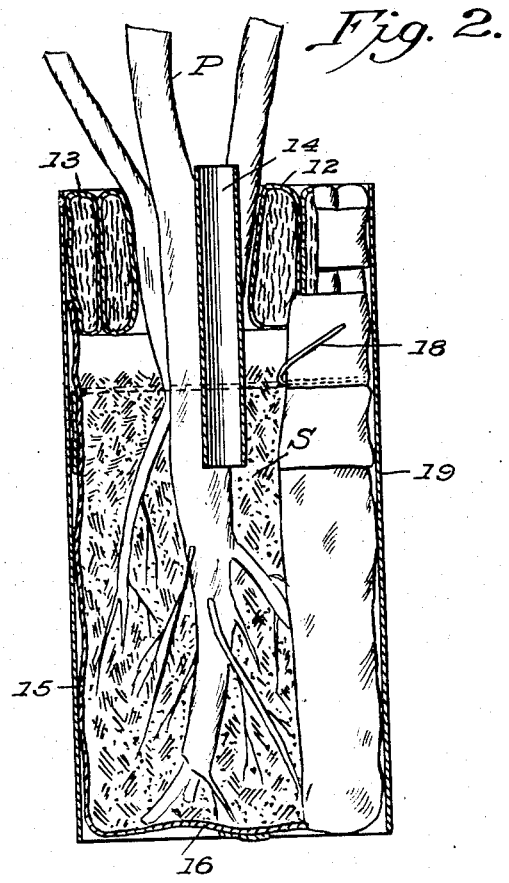
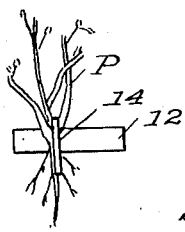
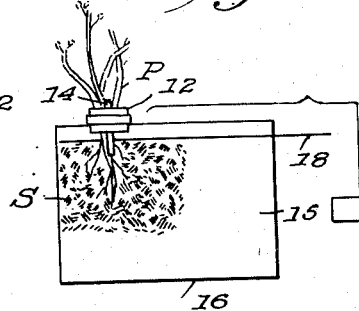
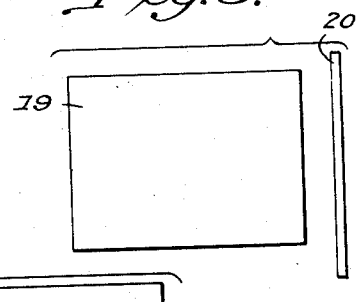
Inventor
CLARK E. GARDNER May 4, 1937.  C. E. GARDNER  2,079,116
SEMIPOTTED PLANT PACKAGE
Filed March 4, 1936   2 Sheets-Sheet 2
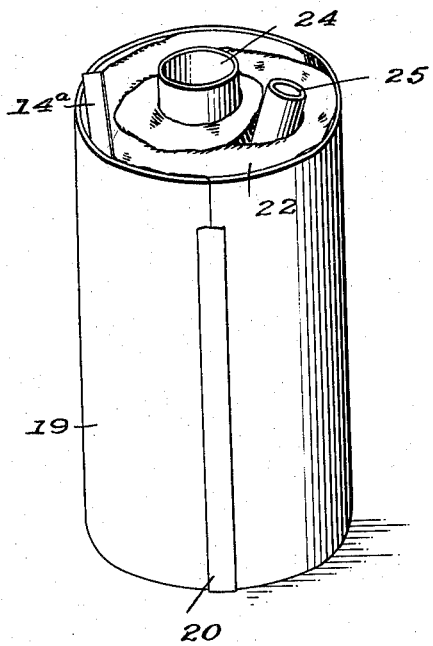
Fig. 6.
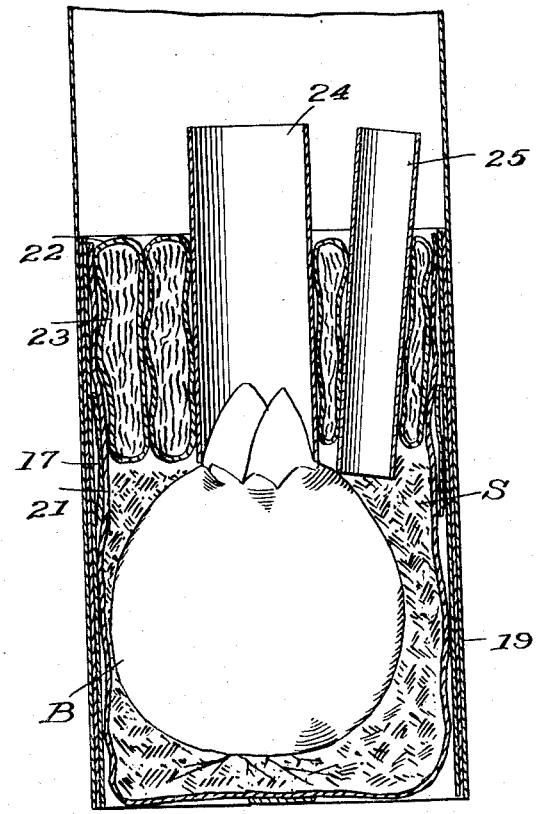
Fig. 7.
Fig. 8.   Fig. 9.   Fig. 10.
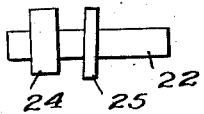 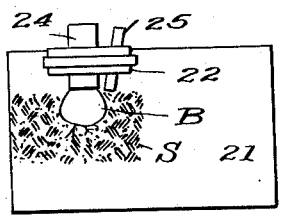 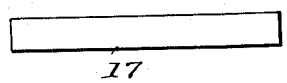
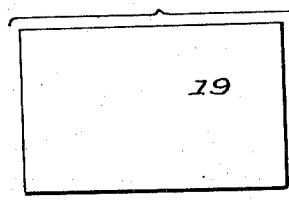
Fig. 11.
Inventor
CLARK E. GARDNER
By
Attorney Patented May 4, 1937

2,079,116

UNITED STATES PATENT OFFICE 2,079,116

SEMIPOTTED PLANT PACKAGE

Clark E. Gardner, Osage, Iowa

Application March 4, 1936, Serial No. 67,121

12 Claims. (Cl. 47—37)

The present invention relates to plant packages and consists in the combinations and arrangements of elements hereinafter described and particularly set forth in the accompanying claims.

The purpose of the invention is to provide a semi-potted plant package which will insure keeping the plants in fresh, vigorous and growing condition while en-route from nursery to stores, or other places of distribution and during display, thereby enabling those handling the same to deliver plants to customers in growing condition thus avoiding the loss incident to spoilage which is usually caused by drying of the package contents.

A further purpose of the invention is to provide a package of this type which after reaching the consumer will maintain its growth for an appreciable period, and thereafter, by removing portions of the package, the same may be placed in the ground without disturbing the roots just as though the plant had been originally potted in the first instance. The invention is further characterized in that it provides a watering tube whereby the plant roots may be thoroughly irrigated until such time as the plants are fully established.

The principle and instrumentalities of the invention as herein disclosed are proposed as an improvement over the types of plant packages disclosed in my U. S. Letters Patent, "Plant package watering device" No. 2,033,627, dated March 10, 1936 and "Watering tube device for packaged plants" No. 2,039,986, dated May 5, 1936.

The invention is shown by way of illustration in the accompanying drawings wherein:

Figure 1 is a perspective view of the semi-potted plant package with parts removed for clearness.

Figure 2 a central sectional view thereof on a slightly larger scale.

Figure 3 a detailed view showing the manner of putting up or forming the dry collar.

Figure 4 a similar view of the elements used and showing the manner of wrapping the plant with dry collar into the first or inner package.

Figure 5 shows the elements of the outer package disassembled.

Figure 6 a view similar to Figure 1 showing the invention applied to a bulb.

Figure 7 a central sectional view thereof on a slightly larger scale.

Figure 8 a detailed view showing the dry collar and irrigating device ready for wrapping.

Figure 9 a similar view showing the plant package ready for final wrapping.

Figure 10 the binding band adapted to have cultural and other directions printed thereon, and Figure 11 shows the sheet and sealing strip of the outer wrapper.

Referring to the construction in further detail and wherein like reference characters designate corresponding parts in the different figures shown the semi-potted plant package consists essentially of a dry collar, an inside package or the semi-potted feature, and an outside wrapper all of which together with the growing plant and sustaining root soil constitutes a unitary and compact article adapted for convenient handling from nursery to time of planting. During this interval the plant has all needed nourishment and is ready for placement in the ground simply by removing the outer package and the dry collar.

The dry collar is formed or made up from a sheet of wax or other moisture proof paper 12 into which is folded cypress wool, excelsior or other suitable packing material 13 the whole being formed into a flat like and flexible tubular body and thence wrapped closely around the plant stems after the manner of a spiral as indicated in Figures 1 and 2. That is to say, the edges of the paper strip 12 are brought together with the enclosing fibrous material 13 in such manner that folds come at the top and bottom of the collar and thereby effectively retain the packing material and keep it from scattering. It also guards against moisture working up into the dry packing from the wet peat or other root sustaining substance. In this the dry collar feature of the invention is deemed highly important inasmuch as plants will usually rot in crown if the wet packing or root sustaining soil is left in contact therewith.

The dry collar also provides means for inserting a watering tube 14 and marker 14a and holding the same in position, such tube and marker being placed in the collar while the same is being wrapped around the crown of the plant or shrub to be packaged. In the process of wrapping the top of the tube is left to project an appreciable distance above the dry collar whereby to receive the irrigating device as more particularly set forth in my two patent applications above identified.

The size and diameter of the collar determines the circumference of the finished package and obviously said collar may vary in size by using more or less of the dry packing material 13 and a corresponding size sheet of wax or other moisture proof paper 12 according to the dimensions of the plants that are to be packed. The wax or other moisture proof paper 12 used in making the collar may appropriately be of various colors to give a pleasant effect to the finished package as will be understood.

Dormant bulbs and other plants having no top growth when packed are taken care of by means of a short cone or tube of proper size and wrapping the same within the collar so that the top of the bulb or plant may be placed at the lower opening of such cone or tube thereby leaving the top growth free to extend up into this tube or cone which can then be removed or left on as desired. Full details of the means and manner of constructing this feature of the invention are described further herein.

*Inside package, or semi-potted feature.*—In making up this element of the package a sheet of wax or other moisture proof paper 15 of suitable size is laid on a table or other flat surface and the plant or shrub P to be packed, having already had the collar 12 with watering tube 14 wrapped around the crown or stems thereof, is placed on the paper 15 with sufficient damp peat or other root packing material S distributed over, under and around the roots so that when the wax sheet 15 is rolled therewith the resultant package will be of substantially the same diameter as the dry collar. In this operation the bottom edge of the paper or other sheet 15 is folded up and rolled into the package so that the bottom of the inner package or semi-potted unit will be substantially water-tight after the manner indicated in Figure 2. This rolling and turning over of the lower portion of the inner package also firms the peat or other packing material S about the roots giving it a potted effect insofar as growth of roots and plant is concerned.

After rolling the inside package as above set forth a printed tape 17 is placed thereon in such manner that its upper edge comes to the crown of the plant or shrub that is packed and when making up the package a stout thread or cord 18 is so placed thereon as to provide a ripping device for severing its upper or plant stem enclosing portion thus freeing the dry collar for removal before planting as will be understood. One end of said rip cord 18 is left free for convenient handling as shown. After removal of the collar the lower portion of the inside package serves as a pot or container for the plant and as such is set wholly within the ground without in any way disturbing the roots or top growth. The watering tube extends well into the soil S and so remains after planting and thus the plant may be irrigated until it becomes well established and its roots have grown through the temporary paper pot or semi-potted package. The length of the inside package is obviously determined by the over-all dimensions of the plant to be put-up, and the tape or strip 17 is for the purpose of having printed therein cultural or other directions as will be understood.

*Outside wrapper.*—This outer container is made of ordinary box-board or other suitable material 19, preferably in attractive colors and varying in size according to the inside package. It extends appreciably under the bottom end of the inside package 15 so that the finished article will stand upright on any level surface. In making up said outer container 19 the first or inner package 15 is placed on the sheet 19 and rolled therewith into a cylindrical package substantially as shown. A suitable adhesive paper tape 20 then secures the side edges, though string, rubber bands or other binding devices may be used. Preferably the outer wrapper has printed thereon information appertaining to the nursery or green house together with appropriate directions, etc.

The finished packages are adapted to be watered through the tubes 14 and are preferably arranged standing upright in suitable packing cases having slotted tops and sides to provide for ample ventilation and light so that the plants, whether dormant or not, will be kept in proper condition and guarded against heating or otherwise subjected to damage in shipping. To this end a watering can with a tag giving full directions as to irrigation would be sent with each shipment instructing clerks or others in charge just as to how and when to water the packages for keeping them fresh and in vigorous growth until sold.

In the construction shown in Figures 6 to 10 the elements of the package are essentially the same as above set forth except that here special provision is made for winter blooming bulbs, lilies, etc., which require storing in cool dark cellars until the roots and top growth start. In this instance the device comprises the inner package 21 adapted to contain the bulb B and plant sustaining material S, all of which is to be planted as above described. The package 21 has an upwardly extending portion 22 containing the moisture non-absorbent material 23 providing the dry collar and in this case said collar is wound closely around an open ended and appreciably large tube 24 which contacts with the upper or sprouting portion of the bulb B and thereby provides for its growth as indicated in Figure 7. In like manner the irrigating tube 25 is wrapped within the material of the dry collar 23 and held in contact with the sustaining soil S of the bulb to permit irrigation thereof in the manner heretofore described.

In putting up this type of package the material of the dry collar is first wrapped around the tube 24 and the irrigating tube 25 located towards the outside. The top of a dormant bulb B is then placed against the lower end of said tube when peat or other root packing material S is spread under, around and below the bulb and then the whole is formed into the inner package after the manner described above for plants, shrubs, etc., which have a top or stem growth. Such bulb packages as are required to be stored are wrapped in plain box-wood wrappers and when top growth has started they are brought into the packing room and clean and printed outside wrappers are put on over the storage wrappers which obviously become more or less soiled due to cellar storage. To protect the tops of bulbs and other tender top varieties, when shipped, a special outside wrapper of appropriate length and allowing for growth enroute is placed around the package and fastened with gummed tape. This outer wrapper can be of transparent paper or heavy or opaque cardboard or boxboard depending on the class and needs of the plants or bulbs packed.

The plant package is made up essentially of a temporary collar portion wrapped about the plant stem portions, adapted to be removed before planting, and a relatively permanent package portion which is formed by rolling the roots into a paper sheet with soil to the diameter of said collar. That is to say the paramount factors of the invention are the removable collar and permanent root containing elements, and the combination of these elements with the irrigating tube device. It will be understood of course that fabric materials other than paper may be used if desired, and also that the collar and package portions may be made up in ways other than by wrapping and rolling.

It will therefore be seen that the elements or general make-up of my semi-potted plant package are simple, may be speedily handled, and the finished product costs less than most of the packages that have heretofore been used for putting up nursery and greenhouse products for sale in over-the-counter-trade.

It will be understood the invention as herein disclosed is not limited to the details of construction shown and described, and that these may be varied without departing from the spirit of the invention as defined by the claims.

What is claimed as new is:

1. The combination with a plant package of a non-absorbent moisture collar associated therewith comprising a length of flexible tubing containing non-absorbent moisture material adapted to be wound around the stems of the plant above the surface of the root embedding soil, as and for the purpose set forth.

2. An article of the character described comprising a package wholly enclosing the plant body, said package having a root and soil holding portion, and an integral upper portion extending around the plant stems, a non-moisture absorbent collar located within said upper portion and closely fitting around the plant stems, and a lateral-wise rip cord for readily detaching said integral upper package portion to permit removal of said collar, as and for the purpose set forth.

3. An article of the character described comprising an inner and rolled package wholly enclosing the plant body, a removable and non-moisture absorbent collar closely wrapped about the plant stems, and a removable outer package enclosing said inner package and the non-absorbent collar, as and for the purpose set forth.

4. A plant package comprising a rolled root and soil holding portion adapted to be planted in the ground therewith, a detachable portion enclosing the plant stems, a removable and non-moisture absorbent collar closely wrapped around the plant stems, a rip cord device for detaching the plant stems enclosing portion to permit removal of said collar before planting the package, and an outer package enclosing the whole adapted to be removed before planting, as and for the purpose set forth.

5. A semi-potted plant package comprising an inner member containing the plant roots with soil and having a portion extending above the plant stems, a dry-collar fitting between said extended portion and closely fitting around the plant stems, an irrigating tube extending from the plant stems into the root soil, and a rip cord device for detaching the upper portion of the inner member to permit removal of the dry-collar; the remaining portion of the package with plant and irrigating tube adapted to be planted in the ground, as and for the purpose set forth.

6. A semi-potted plant package comprising a member adapted to hold the plant and sustaining soil, and having an upwardly extending portion, an open ended tube contacting with the plant body and providing for plant growth therein, and a moisture non-absorbent substance contained within the space between said tube and the upwardly extending portion, as and for the purpose set forth.

7. A semi-potted plant package comprising a member adapted to wholly contain the plant body and sustaining soil therefor and having an upper extending portion; an open ended tube contacting with the plant body and providing for growth therein, a non-moisture absorbent substance closely surrounding said tube and providing a collar for the package, and an irrigating tube extending through said collar into the plant sustaining soil, as and for the purpose set forth.

8. A semi-potted plant package comprising an inner member adapted to contain the plant body and sustaining soil therefor, and having an upwardly extending portion; an open ended tube contacting with the plant body and providing for growth therein, a mass of non-absorbent moisture material closely wrapped around said tube and providing a dry collar for the package, an irrigating tube wrapped within and held by said collar, and a removable outer package enclosing the whole, as and for the purpose set forth.

9. A plant package of the character described comprising a growing plant having a root portion and protruding stems of appreciable size, a removable non-moisture absorbent collar wrapped about the plant stems, and a sheet with soil rolled about the plant roots to substantially the diameter of said collar and forming therewith a unitary package of cylindrical shape, said collar adapted to be removed when the package is planted, as and for the purpose set forth.

10. A plant package of the character described comprising a growing plant having a root portion and protruding stems of appreciable size, a removable non-moisture absorbent collar wrapped about the plant stems, a sheet with soil rolled about the plant roots to substantially the diameter of said collar and forming therewith a unitary package of cylindrical shape, and an irrigating tube extending through the collar and into the root and soil portion, said collar adapted to be removed when the package is planted, as and for the purpose set forth.

11. A plant package of the character described comprising a growing plant having a root portion and protruding stems of appreciable size, a removable non-moisture absorbent collar wrapped about the plant stems, a sheet with soil rolled about the plant roots to substantially the diameter of said collar and forming therewith an inner package of cylindrical shape, and a container for said inner package, said collar adapted to be removed when the package is planted, as and for the purpose set forth.

12. The method of putting up a rooted and stemmed plant package for transportation and planting which consists in first wrapping about the stems a collar of non-moisture absorbent material to an appreciable diameter, then forming a sustaining package about the plant roots and said collar by rolling the same with a sheet and soil to substantially the diameter of said collar and forming therewith a unitary package of cylindrical shape, said collar adapted to be removed when the package is planted, as and for the purpose set forth.

CLARK E. GARDNER.